Patented Oct. 24, 1950

2,527,130

UNITED STATES PATENT OFFICE 2,527,130

HYDROCARBON SYNTHESIS AND THE METHOD OF PREPARING THE CATALYST

Charles E. Hemminger, Westfield, N. J., assignor to Standard Oil Development Company, a corporation of Delaware No Drawing. Application September 22, 1948, Serial No. 50,671

4 Claims. (Cl. 260—449.6)

This invention relates to the catalytic conversion of carbon oxides with hydrogen to form valuable synthetic products. The invention is more particularly concerned with an improved method and catalyst permitting a retardation or the prevention of the deterioration or disintegration of finely divided catalysts having a high activity and selectivity for the formation of normally liquid hydrocarbons in the catlytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°-425° F.) are applied in the manufacture of a substantially saturated hydrocarbon product while at the higher temperatures (about 450°-750° F.) and higher pressures (about 5-25 atmospheres and higher) required for the production of unsaturated and branched-chain products of high antiknock value, iron-type catalysts are more suitable.

In both cases, the reaction is strongly exothermic and the utility of the catalyst declines steadily in the course of the reaction chiefly due to the deposition of non-volatile conversion products such as carbon, paraffin wax, and the like, on the catalyst.

The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like catalyst deposits probably to a substantial extent as a result of the reaction $2CO = C + CO_2$. These deposits can not be readily removed by conventional methods of synthesis catalyst regeneration such as extraction, reduction, steam-treating or the like.

These carbon deposits, when allowed to accumulate, weaken the catalyst structure, probably due to carbide formation which leads to rapid catalyst disintegration particularly in fluid operation. The reduction of the true density of the catalyst resulting from its high content of low-density carbon, coupled with the rapid disintegration of the catalyst particles, causes the fluidized catalyst bed to expand thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly favoring further carbonization and accelerating the deterioration of the fluidity characteristics of the bed.

It has been further found that the various representatives of the group of catalysts having carbonization tendencies vary considerably in their performance in fluid operation. Considerable variations have been noted even among such of these catalysts as contain the same catalytically active metal component, particularly among various iron catalysts.

Normally the catalysts exhibiting the most desirable characteristics of high activity and selectivity to liquid products also have the strongest tendency toward carbonization and disintegration. These findings have prompted generalizations to the effect that the higher the activity and liquid product selectivity of a synthesis catalyst the greater its carbonization and disintegration tendency in fluid operation and vice versa.

It will be appreciated, therefore that the reconciliation of high catalyst activity and selectivity with low catalyst carbonization presents a serious and important problem in the hydrocarbon synthesis art. The present invention is chiefly concerned with a solution of this problem.

It is, therefore, the principal object of the present invention to provide an improved process for the catalytic conversion of CO and $H_2$.

Another object of this invention is to provide means for improving the operation of the catalytic conversion of CO and $H_2$ employing the fluid solids technique.

A more specific object of the present invention is to provide means for reducing the carbonization and disintegration tendencies of certain highly reactive and selective synthesis catalysts used in the catalytic conversion of CO and $H_2$ employing the fluid solids technique.

Other and further objects and advantages will appear hereinafter.

In accordance with the present invention the carbonization tendency of active highly selective and normally strongly carbonizing synthesis catalysts, particularly iron catalysts, may be substantially depressed by the addition to such catalysts, of small amounts of silicon. This addition not only effects a substantial reduction of carbon formation and deposition on iron-type catalysts but in addition improves catalyst selectivity toward valuable liquid products without adverse or undesirable effects on catalyst activity. The carbon inhibiting agent of the invention may be added in proportions varying from about 2% to about 20% by weight, preferably about 3% to 15% by weight of the active carbonizing catalyst component, such as iron. Conventional catalyst promoters, such as alumina, copper and/or the oxides, carbonates, chlorides, fluorides, etc., of potassium or sodium may be added in amounts of about 0.1-10% by weight of the total catalyst.

Catalysts useful for the purposes of the present invention may be prepared by fusing silicon with the other catalyst component and the promoter desired and then cooling, sizing and, if desired, reducing the fused mass. Other useful methods of preparing the catalysts of the present invention comprise mixing powdered silicon with the powdered catalytically active component, preferably in the metallic form, adding the promoter by dry-mixing or impregnation, sintering, sizing, and, if desired, reducing the catalyst mass with hydrogen at temperatures of about 600°–1200° F. until about 60–90% of the oxygen is removed.

Suitable methods of catalyst preparation will be illustrated by the following specific examples.

*Example I*

Pure iron is used as the starting material although other sources of more or less pure iron may be used such as the material which may be obtained by the reduction of sintered pyrites ash of the following composition.

| Element: | Per cent |
|---|---|
| Iron | 67.3 |
| Copper | 0.13 |
| Sulfur | 0.01 |
| Silica ($SiO_2$) | 1.50 |
| Zinc | 0.17 |
| Manganese | 0.13 |
| Phosphorus | 0.0038 |
| Alumina ($Al_2O_3$) | 0.53 |
| Calcium | 0.80 |
| Magnesium | 0.27 |
| Oxygen | 27.0 |
| Nickel oxide (NiO) | 0.09 |

1,000 grams of pure iron are mixed with 100 grams of metallic silicon, 50 grams of alumina ($Al_2O_3$), and 10 grams of potassium carbonate and the mixture is then fused in an induction furnace at about 2500° F. in a reducing atmosphere. The melt may be poured out into a stainless steel tray and allowed to cool. The cooled material may be ground and sized to 6–8 mesh for fixed bed units or —100 mesh for fluid reactors.

*Example II*

1,000 grams of pure iron is fused in an induction furnace at a temperature of about 2500° F. in a reducing atmosphere and 150 grams of metallic silicon is added to the molten mass. The melt is poured into a fire clay crucible to cool and then sized by grinding and screening to a particle size of 6–8 mesh. To the ground catalyst 10 grams of $K_2CO_3$ is added in a water solution.

*Example III*

1,000 grams of finely divided iron metal obtained by thermal decomposition of iron carbonyl is intimately mixed with 50 grams of powdered silicon metal. The mixture is moistened and thoroughly mixed with 100 c. c. of an aqueous solution containing 10 grams of potassium fluoride. The mixture is dried, fused with an oxygen-methane torch at a temperature of about 3000° F., allowed to cool and broken up into lumps of about 6–8 mesh size.

*Example IV*

A catalyst was prepared by reduction of pure $Fe_2O_3$ to which the 10 grams of $K_2CO_3$ was added before reduction.

Catalysts prepared in accordance with Examples II and IV were tested in a fixed bed laboratory unit at the conditions and with the results set forth in the example given below:

*Example V*

| Catalyst Prepared As in Example | II | IV |
|---|---|---|
| Catalyst Charge, c. c. | 50 | 50 |
| Pressure, p. s. i. g. | 250 | 250 |
| Space Velocity, vol. of CO+$H_2$/vol. of catalyst/hr. | 200 | 200 |
| Temperature, °F. | 650 | 650 |
| Feed, $H_2$/CO ratio | 1.0 | 1.0 |
| *Results* | | |
| Per Cent CO Converted | 52.8 | 71.3 |
| Per Cent CO Converted to— | | |
| $CO_2$ | 46.6 | 55.0 |
| $C_1$–$C_3$ Hydrocarbons | 17.8 | 17.7 |
| $C_4$+Hydrocarbons | 35.35 | 26.8 |
| Carbon on Catalyst | 0.25 | 0.5 |
| | 100.00 | 100.0 |
| Ratio $C_4$+/$C_1$+ | .664 | .60 |

It is to be noted that the catalyst of Example II gives superior product distribution due to the incorporation of silicon, i. e. half the carbon formation and 10% greater $C_4$+ in the CO converted to $C_1$+ hydrocarbons. The conversion of CO was low in this test but this constitutes an advantage for this catalyst. It can be employed at higher temperatures without giving a poorer product distribution than the catalyst of Example IV, gaining the advantages of higher octane product, less heavy bottoms and the better heat transfer of high temperature. Again, at the same temperature it is superior in that when employing feeds rich in CO and $H_2$ it does not concentrate the conversion on a limited amount of catalyst. Thus, in a fixed bed or fluid reactor more catalyst may be employed in the reactor so that a larger volume of catalyst per volume of CO and $H_2$ converted can be used, thus spreading out the reaction over all the heat transfer surface of the vessel.

The activity of the catalyst containing silicon, however, may be increased, if desired, by subjecting it to oxidation and reduction before heating whereby the surface area is increased. For this purpose the catalyst in Example II may be heated to 700°–900° F. in a reactor in the presence of controlled amounts of air so as to add 5–10% oxygen by weight to the catalyst. It is then subjected to reduction by hydrogen at about the same temperature. Such an operation permits a two-fold increase of the space velocity without any change in the other conditions.

The results of Example V thus demonstrate that the addition of silicon in accordance with the present invention substantially reduces carbon formation and actually increases the selectivity of the iron catalyst toward the formation of valuable liquid products as determined by the low selectivity to the valueless methane and by the fact that the percentage of converted CO going to $C_4+$ hydrocarbons is superior to that of the catalyst without silicon.

It is noted that the silicon content of the catalyst should not be less than about 2% and not substantially exceed about 20% by weight.

Similar beneficial results may be obtained with the catalysts of the invention when sized to a fluidizable size and used in fluid catalyst operation, the reduced carbon formation resulting in a correspondingly reduced catalyst disintegration and thus in a considerable improvement of fluidization and temperature control as well as in catalyst life. The conditions of fluid synthesis operation are well known in the art and need not be specified here in detail for a proper understanding of the invention by those skilled in the art. Briefly, these conditions may include catalyst particle sizes of 20–200 microns, superficial linear gas velocities of about 0.1–3 ft. per second, bed densities of about 10–120 lbs. per cu. ft., $H_2$:CO ratios of about 0.5:3, gas recycle ratios of about 0–5, temperatures of about 550°–750° F., and pressures of about 150–650 lbs. per sq. in.

While the foregoing description and exemplary operations have served to illustrate specific applications and results of the present invention, other modifications obvious to those skilled in the art are within the scope of the invention. Only such limitations should be imposed on the invention as are indicated in the appended claims.

What is claimed is:

1. In the process of producing valuable conversion products from CO and $H_2$ in the presence of iron catalysts wherein a gas containing CO and $H_2$ in synthesis proportions is contacted at synthesis conditions with a catalyst comprising iron, silicon, and a catalyst promoter, the step of preconditioning said catalyst which essentially consists in treating a reduced fused mixture of about 70–97.9% by weight of iron, about 2–20% by weight of silicon and about 0.1–10% by weight of an alkali metal compound promoting the selectivity of the catalyst toward the formation of normally liquid hydrocarbons from CO and $H_2$ with an oxidizing gas at a temperature of about 700°–900° F. to incorporate about 5–10% by weight of oxygen into the mixture and reducing the mixture with a reducing gas at a temperature of about 700°–900° F.

2. The process of claim 1 wherein said catalyst has a fluidizable particle size and said gas is contacted with said catalyst in the form of a dense turbulent mass of catalyst particles fluidized by said gas and by upwardly flowing volatile reaction products.

3. The process of claim 1 in which said mixture contains about 92.5% by weight of iron obtained by the decomposition of iron carbonyl, about 5% by weight of silicon metal and about 2.5% by weight of potassium fluoride.

4. The process of claim 1 in which said reducing gas is hydrogen.

CHARLES E. HEMMINGER.

REFERENCES CITED

The following references are of record in the file of this patent:

UNITED STATES PATENTS

| Number | Name | Date |
| --- | --- | --- |
| 2,287,891 | Linckh | June 30, 1942 |
| 2,417,164 | Huber | Mar. 11, 1947 |